United States Patent
Van Hoecke et al.

(10) Patent No.: US 11,618,419 B2
(45) Date of Patent: Apr. 4, 2023

(54) MOBILE DEVICE FOR CONNECTED MANUFACTURING FACILITY

(71) Applicant: Ford Global Technologies, LLC, Dearborn, MI (US)

(72) Inventors: Jack Lawrence Jackson Van Hoecke, Dearborn, MI (US); Anthony Melatti, Dearborn, MI (US); Danielle Rosenblatt, Dearborn, MI (US); Hamid M. Golgiri, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 16/756,873

(22) PCT Filed: Oct. 17, 2017

(86) PCT No.: PCT/US2017/056863
§ 371 (c)(1),
(2) Date: Apr. 17, 2020

(87) PCT Pub. No.: WO2019/078817
PCT Pub. Date: Apr. 25, 2019

(65) Prior Publication Data
US 2021/0188225 A1 Jun. 24, 2021

(51) Int. Cl.
*B60T 7/16* (2006.01)
*G08B 7/06* (2006.01)
(Continued)

(52) U.S. Cl.
CPC ............... *B60T 7/16* (2013.01); *G08B 7/06* (2013.01); *H04W 4/021* (2013.01); *H04W 4/023* (2013.01); *B60T 2210/32* (2013.01)

(58) Field of Classification Search
CPC ... H04W 4/40; H04W 4/021; H04W 72/0406; H04W 4/44; H04W 4/46; H04W 8/005
See application file for complete search history.

(56) References Cited

U.S. PATENT DOCUMENTS

| 7,433,801 B2 | 10/2008 | Walacavage et al. |
| 8,326,498 B2 | 12/2012 | Witek |

(Continued)

FOREIGN PATENT DOCUMENTS

| EP | 3057044 A1 | 8/2016 |
| KR | 20170001300 A | 1/2017 |

(Continued)

OTHER PUBLICATIONS

Lawrence, Cate. ProGlove brings smart gloves to the factory. Readwrite. Jun. 28, 2016. 4 pages. https://readwrite.com/2016/06/28/proglove-brings-smart-gloves-to-the-factory-floor-it1/.

(Continued)

*Primary Examiner* — Kwasi Karikari
(74) *Attorney, Agent, or Firm* — Vichit Chea; Brooks Kushman P.C.

(57) ABSTRACT

A method of monitoring user location relative to a vehicle in an industrial setting is provided. The method includes, in response to a proximity of the vehicle to a user mobile device being less than a threshold proximity when the user mobile device is outside of a pedestrian zone defined by a perimeter, effecting an annunciation mode at the user mobile device.

14 Claims, 3 Drawing Sheets

(51) Int. Cl.
*H04W 4/021* (2018.01)
*H04W 4/02* (2018.01)

(56) References Cited

U.S. PATENT DOCUMENTS

| | | |
|---|---|---|
| 8,537,030 B2 | 9/2013 | Perkins |
| 8,874,301 B1 | 10/2014 | Rao et al. |
| 8,945,017 B2 | 2/2015 | Venkatraman et al. |
| 9,202,374 B2 | 12/2015 | Gauger et al. |
| 9,633,538 B1 | 4/2017 | Kozloski et al. |
| 2009/0247167 A1 | 10/2009 | Higashide |
| 2010/0289662 A1* | 11/2010 | Dasilva ............ G01V 15/00 340/686.6 |
| 2011/0006912 A1 | 1/2011 | Sheardown et al. |
| 2014/0104081 A1 | 4/2014 | Cross et al. |
| 2014/0159888 A1 | 6/2014 | Gauger et al. |
| 2017/0142552 A1 | 5/2017 | Salter et al. |
| 2017/0151668 A1 | 6/2017 | Boesen |
| 2017/0337820 A1* | 11/2017 | Glatfelter ............... G08G 1/166 |
| 2017/0355377 A1* | 12/2017 | Vijaya Kumar .. B60W 50/0098 |

FOREIGN PATENT DOCUMENTS

| | | |
|---|---|---|
| WO | 2017069747 A1 | 4/2017 |
| WO | 2017074350 A1 | 5/2017 |

OTHER PUBLICATIONS

Barnes, Kaitlyn. Wearable Technology & the Workplace. Breakaway Staffing and Solutions Inc. Oct. 15, 2015. 8 pages, http://breakawaystaffing.ca/wearable-technology-industrial-workplace/.

Diezma, Pedro. Industrial Sector Utilities and Smart Factories Manufacturing. Zerintia Technologies. Feb. 2, 2016 3 pages. http://zerintia.com/blog/industrial-sector-utilities-smart-factories-manufacturing/.

International Search Report of the International Searching Authority for PCT/US2017/056863 dated Jan. 30, 2018.

* cited by examiner

MOBILE DEVICE FOR CONNECTED MANUFACTURING FACILITY

CROSS-REFERENCE TO RELATED APPLICATION

This application is the U.S. national phase of PCT Application No. PCT/US2017/056863, filed Oct. 17, 2017, the disclosure of which is hereby incorporated in its entirety by reference herein.

TECHNICAL FIELD

This disclosure relates generally to a mobile device, and more particularly to mobile device for use in a connected manufacturing facility.

BACKGROUND

Products, such as automotive vehicles and vehicle systems and components, are typically manufactured and/or produced in a manufacturing facility. Employee safety is often a concern, particularly around large moving vehicles such as forklifts. Employee well-being is also often a concern in such environments.

SUMMARY

A method of monitoring user location relative to a vehicle in an industrial setting is provided. The method may include, in response to a proximity of the vehicle to a user mobile device being less than a threshold proximity when the user mobile device is outside of a pedestrian zone defined by a perimeter, effecting an annunciation mode at the user mobile device.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
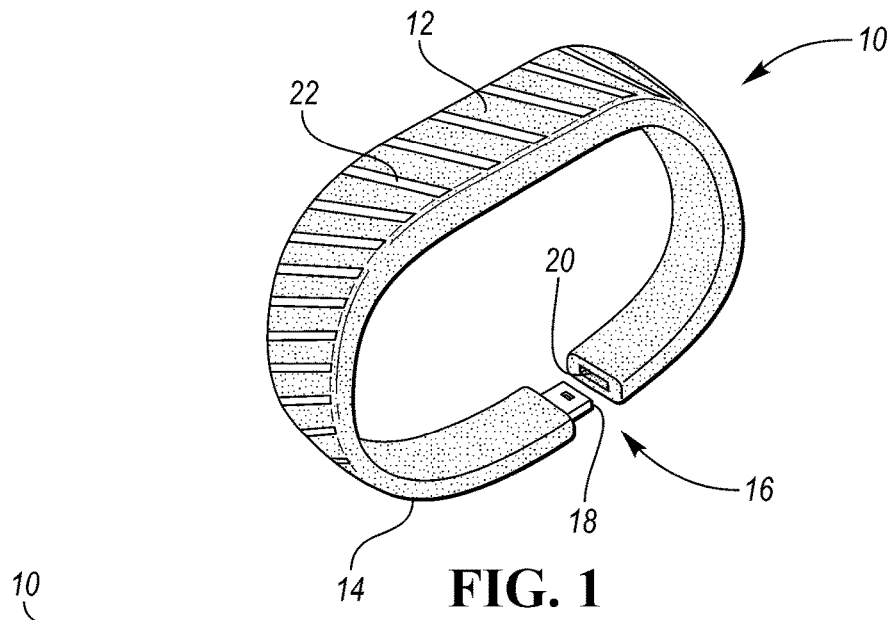
FIG. 1 is a perspective view of a mobile device.

Referring now to FIG. 1, a mobile device is provided. As used herein, a mobile device is a device that can transported by or with a user as a user moves about. In this way, the mobile device may be referred to as a nomadic device 10.

In at least one approach, the nomadic device 10 may be a wearable mobile device. In the approach shown in FIG. 1, the nomadic device 10 is wrist-worn mobile device (e.g., a bracelet). In other approaches, the nomadic device 10 may be in the form of a necklace, arm band, or other wearable adapted to be placed on a user's body. In still another approach, the nomadic device 10 may be unattached to a user's body. Instead, the nomadic device 10 may be carried in the hands of a user, or stored in a pocket of a user. For example, the nomadic device 10 may be in the form of a cellular phone or a radio transceiver.

The nomadic device 10 may include a body portion 12 (that may, for example, house electronics) and an attachment band 14 (that may, for example, facilitate attaching the mobile device to a user). The body portion 12 may include a housing that may be made, for example, of a plastic or plastic-like material. The housing may include electronics disposed therein, as described in greater detail elsewhere herein. The attachment band 14 may be formed of thermoplastic urethane.

The attachment band 14 may include a closure mechanism 16 at distal ends of the attachment band 14. The closure mechanism 16 may include, for example, a protruding tab 18 at one distal end, and a recess 20 formed in the other distal end. The protruding tab 18 may be inserted into the recess 20 to secure the distal ends (e.g., via a friction-fit engagement) and retain the nomadic device 10 on the user.

The nomadic device 10 may also include a visual display 22. The visual display 22 may be in the form of one or more LED lights. The visual display 22 may be disposed on the body portion 12, the attachment band 14, or both the body portion 12 and the attachment band 14.

Figure 2:
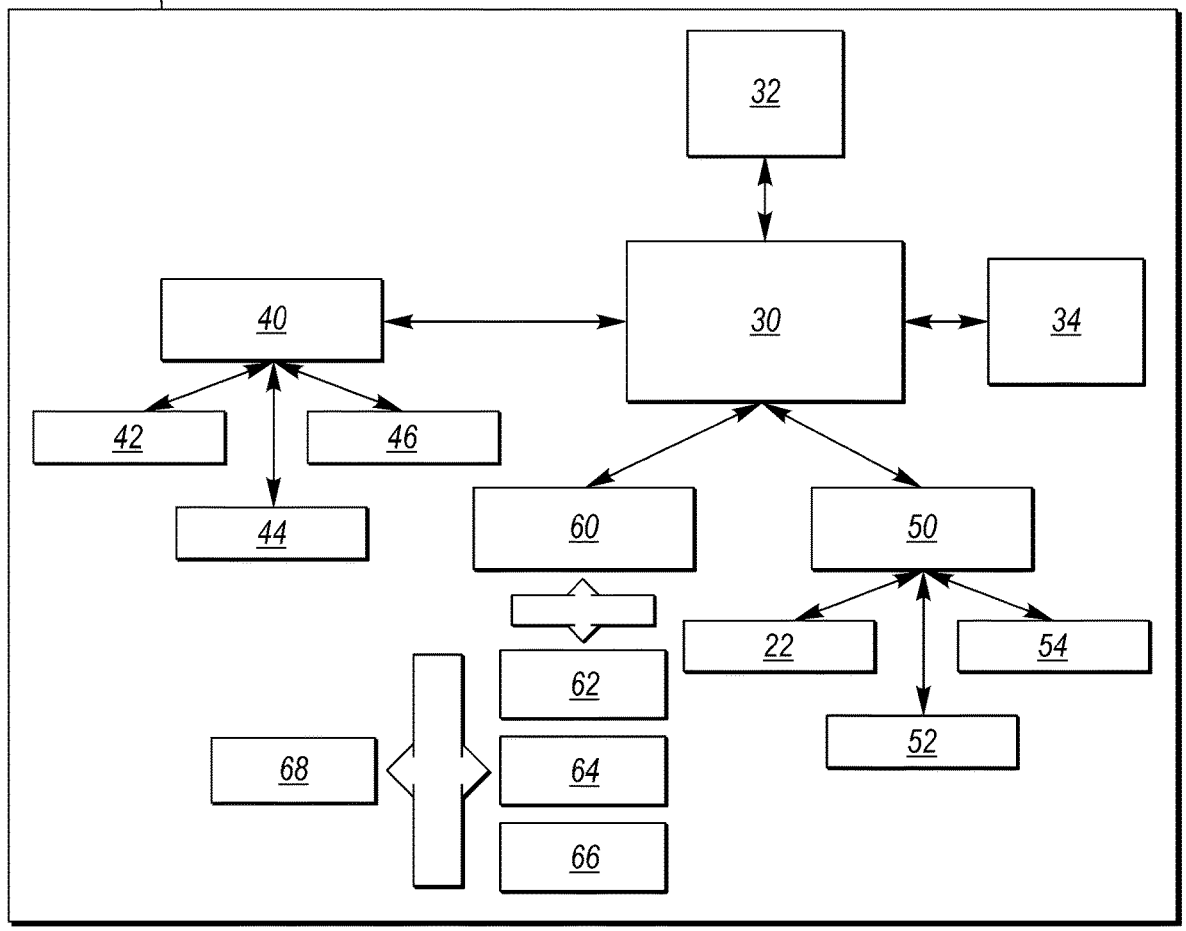
FIG. 2 is a schematic of components of the mobile device.

Referring now to FIG. 2, the nomadic device 10 may include a controller 30. The controller 30 can be a single device or a number of devices. Control module, module, controller, control unit, processor and similar terms may mean one or various combinations of one or more of Application Specific Integrated Circuit(s) (ASIC), electronic circuits, central processing units (preferably microprocessor(s)) and associated memory and storage, executing one or more software or firmware programs, combinational logic circuits, input/output circuits and devices, appropriate signal conditioning and buffer circuitry, and other suitable components. The controller 30 may have sets of control algorithms, including software program instructions and calibration references stored in memory and executed to provide desired functions. Algorithms may be executed at predetermined times or loops, such as by a central processing unit, and may be operable to monitor inputs from sensing devices and other networked control modules, and execute control and diagnostic routines to control operation of actuators, or algorithms may be executed in response to occurrence of an event.

The nomadic device 10 may include a memory 32. The memory 32 may be part of the controller 30, or may be separate from the controller 30. The memory may be, for example, Flash, ROM, RAM, EPROM, and/or EEPROM). The memory 32 may store software code.

The memory 32 may also store information pertaining to one or more users. For example, the memory 32 may store user names or other user identification that may be used to identify specific individuals or groups of individuals. The memory 32 may also store information pertaining to one or more tasks to types of tasks to be performed by an individual. In this way, the nomadic device 10 may be a personal mobile device. The memory 32 may also store a location of the nomadic device 10, as discussed in greater detail elsewhere herein.

The nomadic device 10 may also include an energy source 34 (such as one or more rechargeable batteries or supercapacitors) for providing power to one or more components of the nomadic device 10.

The nomadic device 10 may include one or more additional controllers. For example, the mobile device may include a sensory controller 40. The sensory controller 40 may be in communication with one or more sensors of the nomadic device 10. For example, the nomadic device 10 may be provided with a motion detecting sensor 42, such as an accelerometer a gyroscope. A motion detecting sensor 42 may be adapted to sense a user's activity (e.g., walking or stationary), a step count, or a step rate or other cadence measurement.

The mobile device may also be provided with one or more biometric sensors, i.e., devices that measure one or more characteristics of a human operator. For example, the nomadic device 10 may be provided with a temperature-sensing device 44 such as a thermometer. The temperature-sensing device 44 may be adapted to sense the skin temperature and/or body temperature of the user. The temperature-sensing device 44 may also be adapted to sense an ambient air temperature.

The nomadic device 10 may also be provided with a heart rate monitor 46. The heart rate monitor 46 may, for example, use photoplethysmography to determine a heart rate of the user. Other examples of biometric sensors are possible to measure or calculate a plurality of other physiological metrics including, for example, energy expenditure (e.g., calorie burn), floors climbed and/or descended, heart rate variability, heart rate recovery, location and/or heading (e.g., through GPS, GLONASS, or a similar system), elevation, ambulatory speed and/or distance traveled, blood pressure, blood glucose, skin conduction, muscle state measured via electromyography, brain activity as measured by electroencephalography, weight, body fat, caloric intake, nutritional intake from food, medication intake, pH levels, hydration levels, respiration rate, and other physiological metrics.

The nomadic device 10 may also include an annunciation controller 50. The annunciation controller 50 may be in communication with one or more annunciation devices. For example, the annunciation controller 50 may be in communication with the visual display 22 shown in FIG. 1. The annunciation controller 50 may also be in communication with a haptic device 52, such as a vibration motor that may be adapted to cause a vibration at the nomadic device 10. The annunciation controller 50 may also be in communication with a speaker 54 adapted to effect a sound at the nomadic device 10. In this way, the annunciation controller 50 may be adapted to effect an annunciation mode at the nomadic device 10, as described in greater detail elsewhere herein.

The nomadic device 10 may also include a communication controller 60. The communication controller 60 may be in communication with one or more communication modules. The communication modules may be a transmitter, receiver, or transceiver adapted to transmit and/or receive a wireless signal. For example, the communication controller 60 may be in communication with one or more of a radio module 62 (e.g., a low frequency radio module), a Bluetooth Low Energy (BLE) module 64, and a radio-frequency identification (RFID) module 66. The communication controller 60 may be adapted to transmit and/or receive wireless signals via an antenna 68. In this way, the nomadic device 10 may be in communication, for example, with other nomadic device 10, or one or more vehicles, as discussed in greater detail elsewhere herein.

The biometric sensors of the nomadic device 10 may be used to monitor the activity of a user. For example, if the sensory controller 40 detects (e.g., via the temperature-sensing device 44) that a user's body temperature is elevated (e.g., above a threshold temperature), the annunciation controller 50 of the nomadic device 10 may effect an annunciation through one or more of the visual display 22, the haptic device 52, and the speaker 54. In this way, the user may be alerted to take a break. The communication controller 60 may also be adapted to effect a signal indicative of the user's activity. In one example, the communication controller 60 may effect a signal to another device or individual, such as a supervisor.

Figure 3:
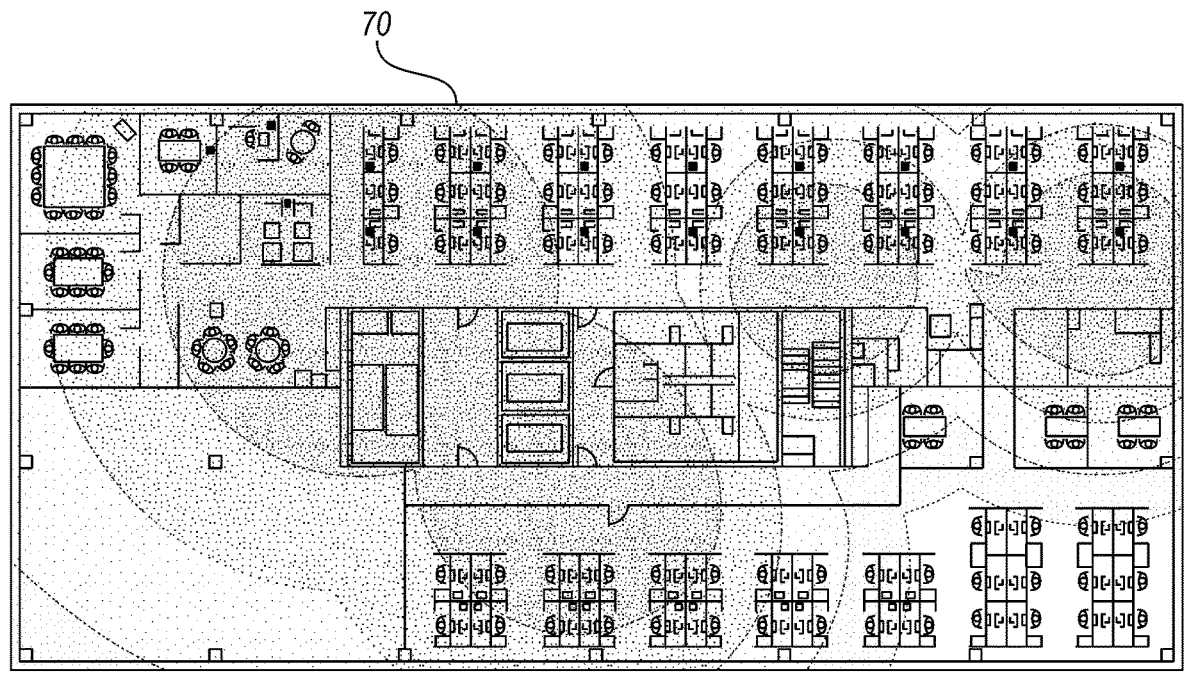
FIG. 3 is an example map displaying representative information acquired from a plurality of mobile devices.

In another example, the communication controller 60 may effect a signal indicative of the user's activity to a central database. The central database may concurrently accumulate the activity of multiple users. For example, biometric information of tens or even hundreds of employees may be accumulated at the central database. From this information, maps of the working environment can be generated. An example of a map 70 is shown in FIG. 3. The maps may indicate heart rates and/or temperatures of the users wearing the nomadic devices 10. Such maps may be used to help identify areas having elevated temperatures that may be due, for example, to heating, ventilation, and air conditioning (HVAC) issues. In response to identifying such issues, remedial measures may be taken. Such maps may also be used to help identify areas having users that may be overworked. In response, remedial measures such as reallocation of job responsibilities may be taken.

Figure 4:
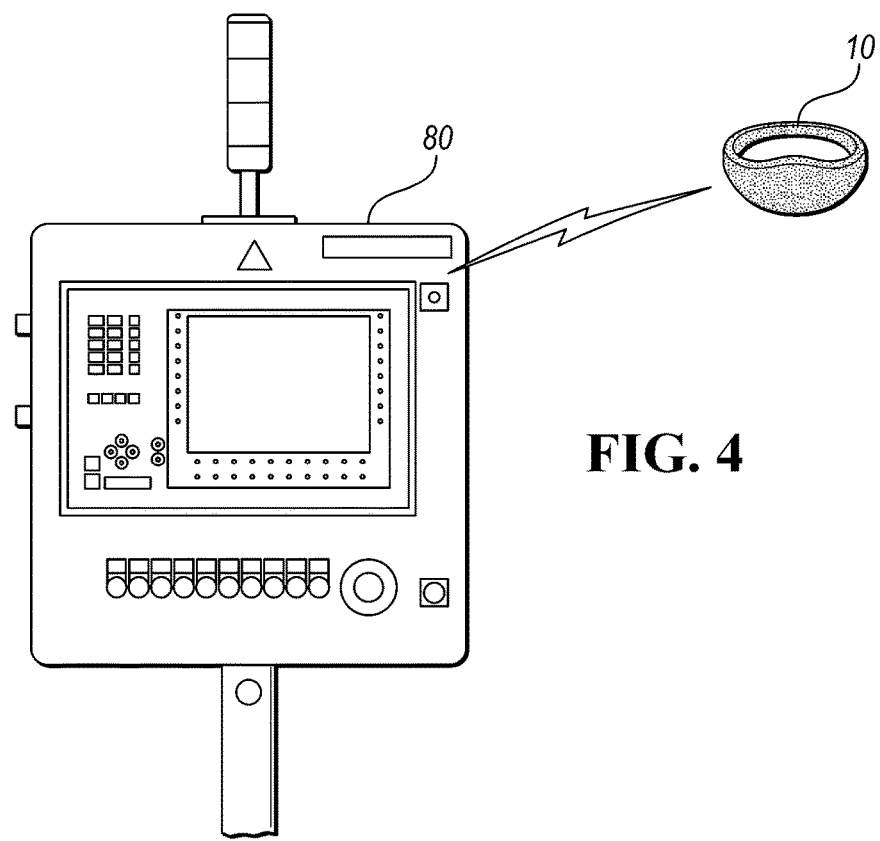
FIG. 4 depicts a programmable logic controller paired with a mobile device.

Referring now to FIG. 4, the nomadic device 10 may be adapted to communicate with a programmable logic controller (PLC) 80. The PLC 80 may be provided at an operating station or cell where, for example, a user may perform machining, assembly, or other operation on a workpiece. The PLC 80 may automate work station operations and material flow. The PLC 80 may be an industrial computer control system that continuously monitors the state of input devices and makes decisions based on custom software to control the state of output devices. The PLC 80 may include a central processing unit (CPU), a memory system, input modules and output modules, a programming device, and one or more operating modules that allow an operator to process information to be displayed and new control parameters to be entered.

The PLC 80 may perform various operations, including scanning the state of input devices, executing user created program logic, controlling output devices connected to the PLC, and performing miscellaneous housekeeping activities which may include communications with programming terminals, internal diagnostics, etc. Several languages may be employed to program the PLC 80 such as ladder logic. The PLC 80 may utilize simulation software programs that allows simulation of a variety of operating conditions useful in designing and testing the PLC system. As a result, in part, of the development of simulation programs, a number of "virtual" relationships are established between tooling, control devices, PLC logic, PLC I/O fault bits, etc.

The nomadic device 10 may be adapted to "pair" with the PLC 80. In at least one approach, pairing of the nomadic device 10 with the PLC 80 may be initiated by bringing the nomadic device 10 into contact with the PLC 80. For example, the body portion 12 of the nomadic device 10 may be tapped against the PLC 80 (e.g., at a designated location of the PLC 80). In response to the motion detecting sensor 42 detecting the contact, the communication controller 60 may be adapted to effect a pairing signal to the PLC 80. The pairing signal may be an RFID signal or other suitable signal, and may include information pertaining to the nomadic device 10 itself (e.g., mobile device identification or address information), as well as information pertaining to the user (e.g., user identification information). In at least one approach, the PLC 80 may send a responsive signal (such as a confirmation signal) to the nomadic device 10. In this way, the PLC 80 may be informed of the user operating at the operating station corresponding to the PLC 80.

The PLC 80 may also send operational communications to the paired nomadic device 10 relating to the operation being performed by the user. The operational communications may be real-time or substantially real-time communications. For example, in response to a user completing a job, the PLC 80 may send an operational communication indicative of the job being complete. Conversely, in response to a user failing to complete a job, the PLC 80 may send an operational communication indicative of the job being incomplete. The nomadic device 10 may receive the operational communication at the communication controller 60. In response to receiving the operational communication, the annunciation controller 50 of the nomadic device 10 may be adapted to effect an annunciation perceivable by the user. For example, the annunciation controller 50 may effect a visual annunciation at the visual display 22, a vibration annunciation at the haptic device 52, or an audible annunciation at the speaker 54. Thus, the PLC 80 may be adapted to send operational communications when a manufacturing parameter achieves a manufacturing threshold, or when the manufacturing parameter does not achieve the manufacturing threshold.

Figure 5:
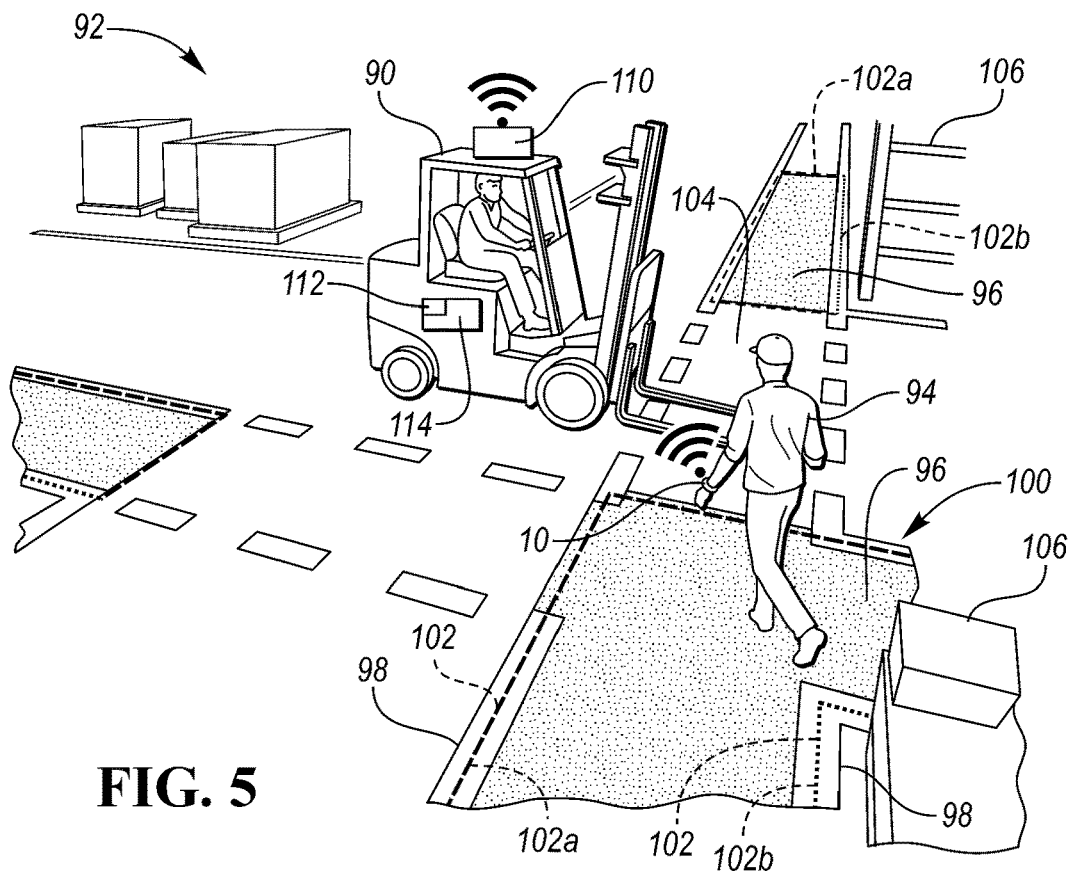
FIG. 5 depicts a manufacturing setting in a first scenario.
Figure 6:
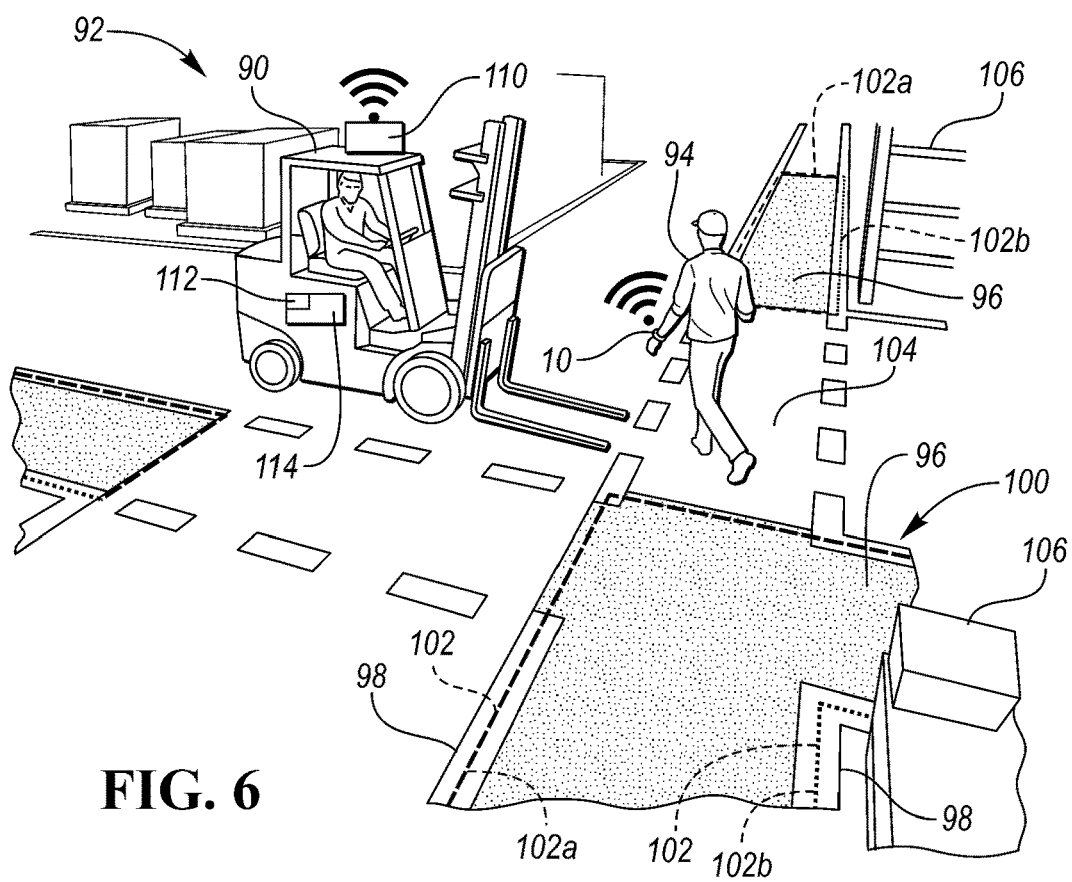
FIG. 6 depicts a manufacturing setting in a second scenario.

Referring now to FIGS. 5 and 6, the nomadic device 10 may provide for the monitoring of a user location relative to a vehicle 90 in an industrial setting 92. In the approach shown, the nomadic device 10 is a wearable device worn the wrist of a user 94.

The vehicle 90 may be a type of vehicle used in an industrial setting, such as a fork lift. The industrial setting 92 may be, for example, a factory or manufacturing plant. In the industrial setting 92, workers may manufacture goods or operate machines to process one product into another. The industrial setting 92 may include designated pedestrian zones 96. Visual indicia, such as colored paint, may be used to designate the pedestrian zones. The pedestrian zones 96 may be defined by a perimeter 98.

To reduce accidents involving workers and vehicles, workers may be encouraged to remain within the pedestrian zones 96, and to exercise caution when not within the pedestrian zones 96. Similarly, vehicle drivers may be encouraged to remain outside of the pedestrian zones 96 when operating vehicles, and to exercise caution when within the pedestrian zones 96 when operating vehicles.

The industrial setting 92 may also be provided with enhanced safety features such as a pedestrian detection system 100. The pedestrian detection system 100 may include a perimeter wire 102 that may be disposed about a perimeter 98 of a pedestrian zone 96. The perimeter wire 102 may be disposed in any suitable manner. For example, the perimeter wire 102 may be embedded in a ground surface of the industrial setting 92 (e.g., embedded within the cement), may be adhered or otherwise fixed on top of the ground surface, etc. Although shown herein as disposed on a ground surface, the perimeter wire 102 may also, or instead, be disposed above the ground surface. For example, the perimeter wire 102 may be secured one or more objects above the ground surface, may be secured to a ceiling, or may be suspended from the ceiling.

The perimeter wire 102 may include an outer perimeter wire 102a that may be disposed, for example, at an outer perimeter of the pedestrian zone 96 (e.g., adjacent a vehicle pathway 104). The perimeter wire 102 may also include an inner perimeter wire 102b that may be disposed, for example, at an inner perimeter of the pedestrian zone 96 (e.g., adjacent work materials 106).

The perimeter wire 102 may be adapted to emit a perimeter wireless signal. The perimeter wireless signal may be, for example, a radio frequency (RF) signal. The energy of the RF signals may be greater at a distance close to the perimeter wire 102, and the energy of the signal may be reduced as the location from the perimeter wire 102 is increased. In this way, an RF signal may have different energies at different distances from the perimeter wire 102. Although described herein as RS signals, the perimeter wireless signal may be any suitable wireless signal (e.g., Bluetooth, Zigbee, Ultra Wide Band, Wi-Fi, etc.). The perimeter wireless signal may also be adapted to effect a magnetic field about the perimeter wire 102.

The nomadic device 10 may receive the perimeter wireless signal. In response to receiving the signal, the nomadic device 10 may perform a localization determination. The localization determination may be a proximity determination that calculates an approximate distance between the perimeter wire 102 and the nomadic device 10. Various techniques are available for determining the approximate distance between two devices communicating with one another wirelessly. In some approaches, the distance may be determined using a radio frequency "time of flight" estimation. For example, one technique measures relationships between known locations and compares those with an unknown location/relationship, such as the nomadic device 10. Based at least in part on the localization determination, the nomadic device 10 may determine whether the nomadic device 10 (and therefore, very likely the user) is located within a pedestrian zone 96. The nomadic device 10 may be adapted store its current location, for example, in memory 32 shown in FIG. 2.

The nomadic device 10 may further be in communication with the vehicle 90. In this way, the vehicle 90 may be provided with a communication module 110 that may be a transmitter, receiver, or transceiver adapted to transmit and/or receive a wireless signal. The nomadic device 10 may perform a vehicle proximity determination, similar to the localization determination discussed with respect to the perimeter wire 102. The nomadic device 10 may further be adapted to perform a proximity change determination. The proximity change determination may be performed, for example, using the wireless signal emitted from the vehicle 90. The proximity change determination may determine a direction of movement of the vehicle 90 relative to the nomadic device 10. The proximity change determination may also determine a rate of change of movement of the vehicle 90 relative to the nomadic device 10.

Referring to FIG. 5, the nomadic device 10 may determine a proximity between a vehicle 90 and the nomadic device 10 is less than a threshold proximity. This determination may be made, for example, via the controller 30 shown in FIG. 2. The threshold proximity may be, for example, in a range of approximately 4 to approximately 15 feet. The nomadic device 10 may further determine a proximity between a vehicle 90 and the nomadic device 10 is decreasing. The decreasing proximity may be indicative of a vehicle 90 approaching a user 94. However, because the user 94 is within the pedestrian zone 96 (as indicated by the localization determination that may be stored in the memory 32 of the nomadic device 10), the nomadic device 10 may not effect an annunciation mode at the nomadic device 10.

However, referring to FIG. 6, the nomadic device 10 may be adapted to effect an annunciation at the nomadic device 10 (e.g., via the annunciation controller 50 shown in FIG. 2) when the controller 30 determines a proximity between a vehicle 90 and the nomadic device 10 is less than a threshold proximity, and the user 94 is not located within the pedestrian zone 96 (as indicated by the localization determination that may be stored in the memory 32 of the nomadic device 10). As described, in the annunciation mode, the annunciation controller 50 may be adapted to effect one or more of a visual annunciation, an audible annunciation, and a haptic annunciation. In this way, a user 94 may be alerted of an increased potential for an accident. The nomadic device 10 may further be adapted to send a signal to the vehicle 90. In response to receiving the signal, the vehicle 90 may be adapted to effect a vehicle annunciation mode at the vehicle 90. The vehicle annunciation mode may also include one or more of a visual annunciation, an audible annunciation, and a haptic annunciation.

In at least one approach, the nomadic device 10 may be adapted to exit the annunciation mode (or inhibit initiation of the annunciation mode) when the nomadic device 10 determines determine a proximity between a vehicle 90 and the nomadic device 10 is increasing (or is otherwise not decreasing).

The vehicle 90 may be provided with an autonomous emergency braking (AEB) system 112 for effecting an autonomous braking mode at the vehicle 90. The AEB system 112 may include a controller 114 adapted to apply a braking force to reduce the speed of the vehicle 90. When the nomadic device 10 (e.g., at controller 30) determines a proximity between a vehicle 90 and the nomadic device 10 is decreasing, and the user 94 is not located within the pedestrian zone 96, the nomadic device 10 may send an AEB signal to the vehicle 90. In response to receiving the AEB signal, the controller 114 of the AEB system 112 may apply a braking force at the vehicle 90, thereby slowing or stopping the vehicle 90.

The AEB system, in addition to or instead of effecting the autonomous braking mode based on a decreasing proximity, may also be adapted to effect the autonomous braking mode based on a rate of change exceeding a threshold rate of change. In this way, the autonomous braking mode may be inhibited during a controlled (e.g., slow) approach of the vehicle 90 to a user 94.

In at least one approach, the AEB system 112 may also effect an autonomous braking mode when the proximity between the vehicle 90 and the nomadic device 10 is less than a AEB threshold proximity. The AEB threshold proximity may the same as, or different than (e.g., less than) the threshold proximity selected to effect the annunciation mode at the nomadic device. The AEB system 112 may effect the autonomous braking mode at the vehicle 90 based on the AEB threshold proximity as well as a proximity change or proximity rate of change, as discussed above.

In at least one approach, a method of monitoring user location relative to a vehicle in an industrial setting is provided. The method may include determining whether a user mobile device is outside of a pedestrian zone defined by a perimeter. The perimeter may include a perimeter wire disposed about the pedestrian zone. The method may also include emitting a perimeter wireless signal at the perimeter wire, and receiving the perimeter wireless signal at the user mobile device. The user mobile device, in response to receiving the perimeter wireless signal, may determine if the user mobile device is outside of the pedestrian zone.

The method may also include detecting a proximity of the vehicle to a user mobile device. For example, the vehicle may emit a vehicular wireless signal, and the user mobile device may receive the vehicular wireless signal. The user mobile device, in response to receiving the vehicular wireless signal, may process the vehicular wireless signal to obtain a determined proximity of the vehicle to the user mobile device.

In response to the proximity being less than a threshold proximity when the user mobile device is outside of the pedestrian zone, the method may include effecting an annunciation mode at the user mobile device. For example, the user mobile device, having already determined it is outside of the pedestrian zone, may effect the annunciation mode in response to receiving the vehicular wireless signal. In at least one approach, in the annunciation mode, the user mobile device is adapted to effect at least one of a visual annunciation, an audible annunciation, and a haptic annunciation.

The vehicle may be adapted to effect a vehicle annunciation mode in response to the proximity of the vehicle to the user mobile device being less than the threshold proximity when the user mobile device is outside of the pedestrian zone defined by the perimeter.

The method may further include determining a rate of change of the proximity of the vehicle to the user mobile device. In at least one approach, in response to the proximity of the vehicle to the user mobile device decreasing at a rate of change exceeding a threshold rate of change when the user mobile device is outside of the pedestrian zone defined by the perimeter, the method may include effecting an autonomous braking mode at the vehicle. An annunciation mode may also be effected at the user mobile device.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method of monitoring user location relative to a vehicle in an industrial setting comprising:
   at a controller:
   responsive to a proximity of the vehicle to a user mobile device being less than a threshold proximity when the user mobile device is outside of a pedestrian zone defined by a perimeter, effecting an annunciation mode at the user mobile device,
   in response to the proximity of the vehicle to the user mobile device being less than the threshold proximity when the user mobile device is outside of the pedestrian zone defined by the perimeter, effecting a vehicle annunciation mode at the vehicle, wherein the annunciation mode is a first device annunciation mode and wherein the vehicle annunciation mode is a first vehicle annunciation mode,
   in response to the proximity of the vehicle to the user mobile device decreasing at a rate of change exceeding a threshold rate of change when the user mobile device is outside of the pedestrian zone defined by the perimeter, effecting an autonomous braking mode at the vehicle, and
   in response to the proximity of the vehicle to the user mobile device decreasing at a rate of change exceeding the threshold rate of change when the user mobile device is outside of the pedestrian zone defined by the perimeter, effecting a second device annunciation mode at the user mobile device different than the first device annunciation mode, and effecting a second vehicle annunciation mode at the vehicle different than the first vehicle annunciation mode.

2. The method of claim 1 wherein the perimeter comprises a perimeter wire disposed about the pedestrian zone, the method further comprising:
   at the perimeter wire, emitting a perimeter wireless signal; and
   at the user mobile device, receiving the perimeter wireless signal.

3. The method of claim 2 further comprising:
   at the user mobile device, in response to receiving the perimeter wireless signal, determining if the user mobile device is outside of the pedestrian zone.

4. The method of claim 1 further comprising:
   at the vehicle, emitting a vehicular wireless signal; and
   at the user mobile device, receiving the vehicular wireless signal.

5. The method of claim 4 wherein effecting the annunciation mode comprises effecting the annunciation mode in response to receiving the vehicular wireless signal.

6. The method of claim 4 further comprising:
   in response to receiving the vehicular wireless signal, processing the vehicular wireless signal to obtain a determined proximity of the vehicle to the user mobile device, wherein effecting the annunciation mode comprises effecting the annunciation mode in response to the determined proximity of the vehicle to the user mobile device being less than the threshold proximity.

7. The method of claim 1 wherein in the annunciation mode, the user mobile device is adapted to effect at least one of a visual annunciation, an audible annunciation, and a haptic annunciation.

8. The method of claim 1 further comprising:
   in response to a user physiological state exceeding a user physiological threshold, effecting the annunciation mode at the user mobile device.

9. The method of claim 8 wherein the user physiological state a user heart rate.

10. The method of claim 8 wherein the user physiological state a user temperature.

11. A system for monitoring user activity in an industrial setting comprising: a plurality of user mobile devices; and
    a controller in communication with the plurality of user mobile devices;
    wherein an individual user mobile device of the plurality of user mobile devices includes:
    a programmable memory adapted to store a unique user identifier;
    a biometric sensor adapted to sense a user physiological state;
    an annunciation controller adapted to effect an annunciation at the user mobile device; and
    a communication controller adapted to effect wireless communication between the user mobile device and the controller, wherein Lathe wireless communication includes the unique user identifier and the user physiological state, (ii) the communication controller is adapted to pair the user mobile device with the controller when the user mobile device is disposed at or within a predefined proximity of the controller to enable the wireless communication therebetween, (iii) the annunciation controller is adapted to effect the annunciation at the user mobile device in response to a wireless signal received at the user mobile device from the controller when the user mobile device is paired with the controller, and (iv) the controller is adapted to send the wireless signal in response to (a) a manufacturing parameter achieving a manufacturing threshold or (b) the manufacturing parameter not achieving the manufacturing threshold.

12. The system of claim 11 wherein the user physiological state is at least one of a user heart rate and a user temperature.

13. The system of claim 11 wherein the annunciation is at least one of a visual annunciation, an audible annunciation, and a haptic annunciation.

14. The system of claim 11 wherein in response to the user physiological state exceeding a user physiological threshold, the annunciation controller is adapted to effect the annunciation at the user mobile device and the communication controller is adapted to send the unique user identifier and the user physiological state to the controller.

* * * * *